Figure 24:
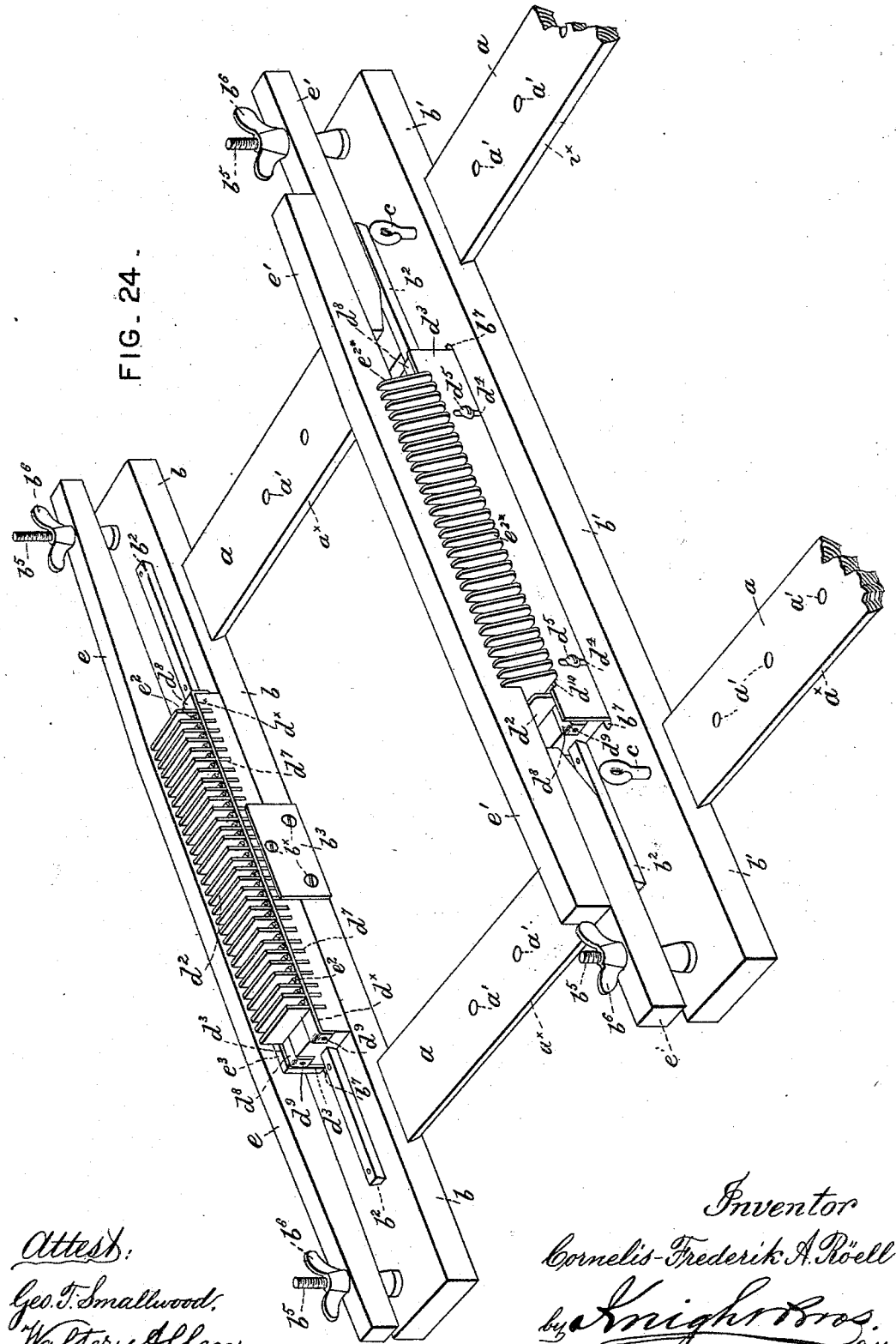

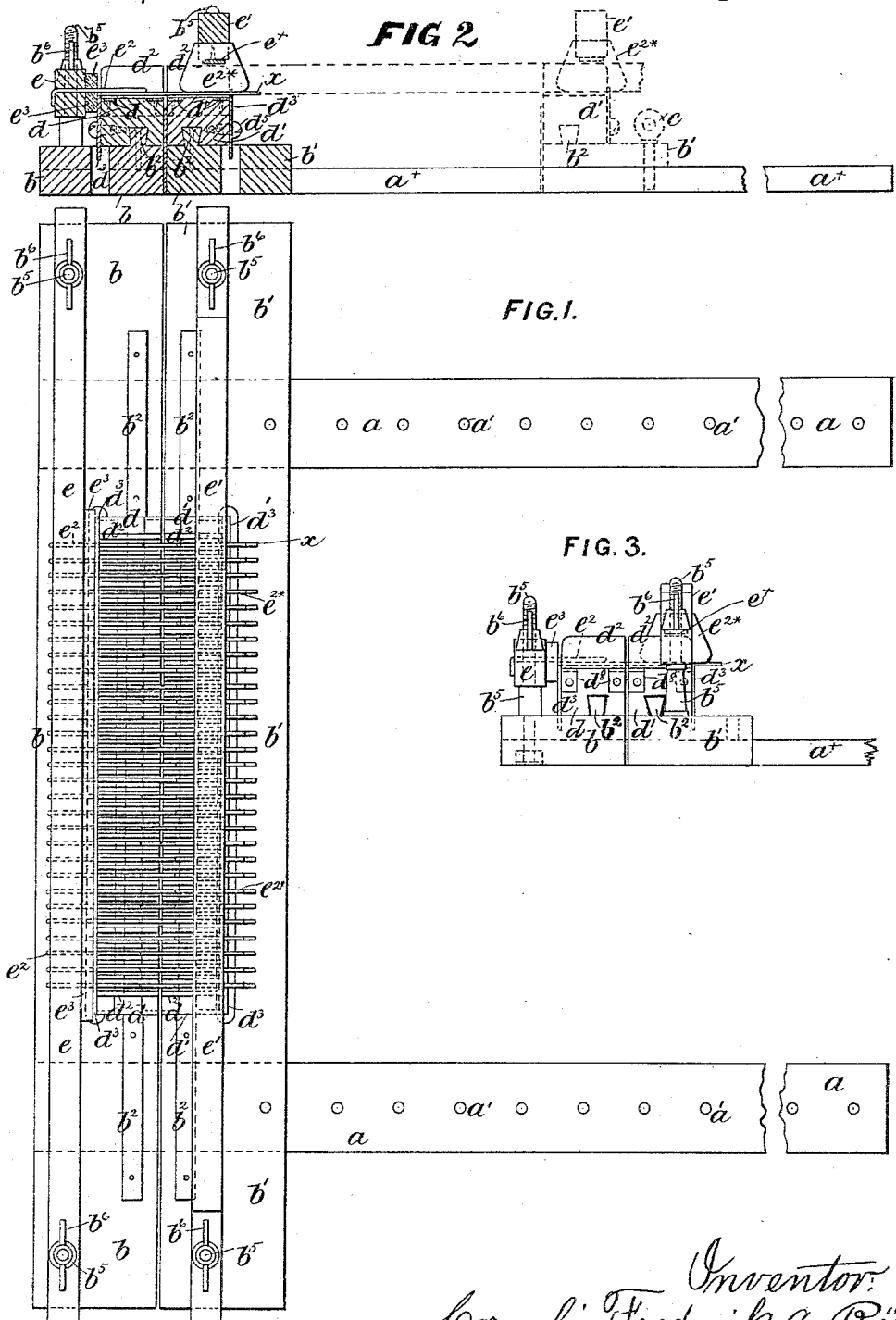

(No Model.)
C. F. A. RÖELL.
PLAITING APPARATUS.
No. 401,214. Patented Apr. 9, 1889.
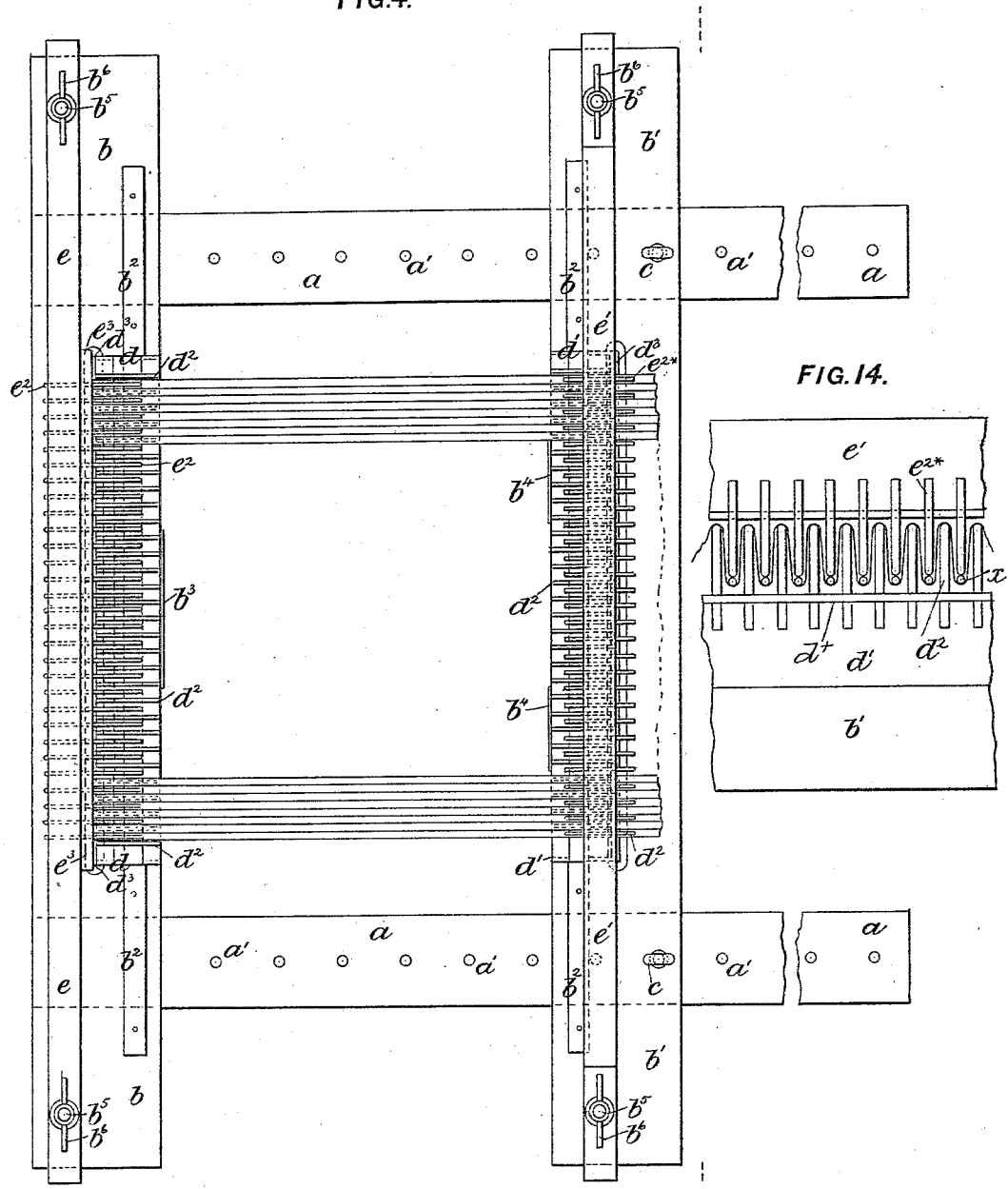

(No Model.) 7 Sheets—Sheet 3.
C. F. A. RÖELL.
PLAITING APPARATUS.
No. 401,214. Patented Apr. 9, 1889.
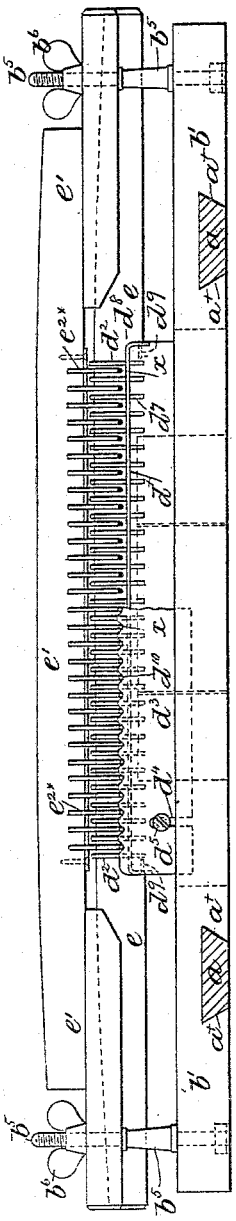
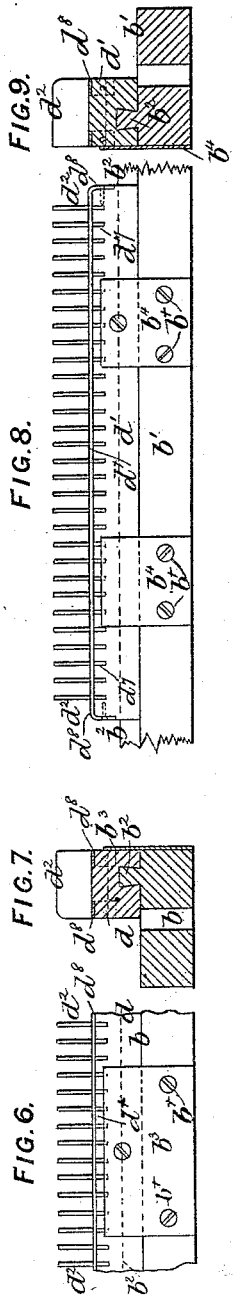
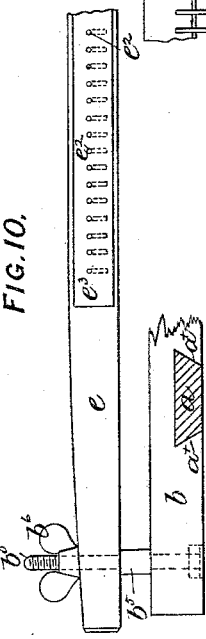
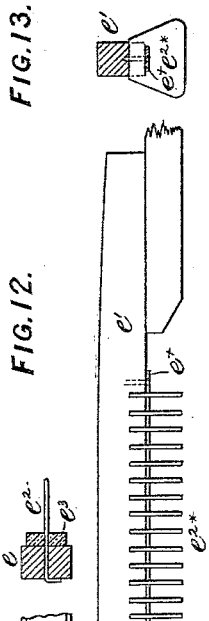
Attest:
Emma Arthur
Frank L. Ree.
Inventor:
Cornelis Frederik A. Röell
By Knight Bros.
Attys.

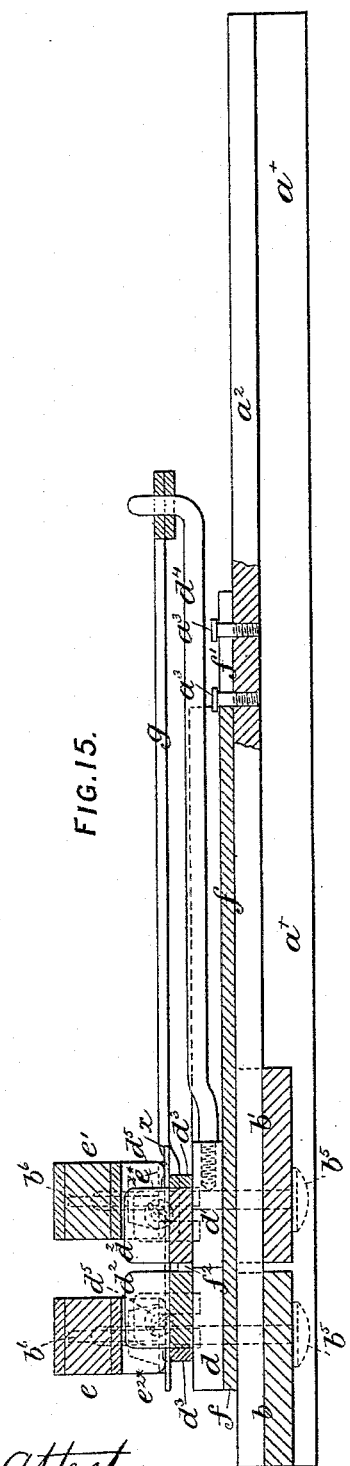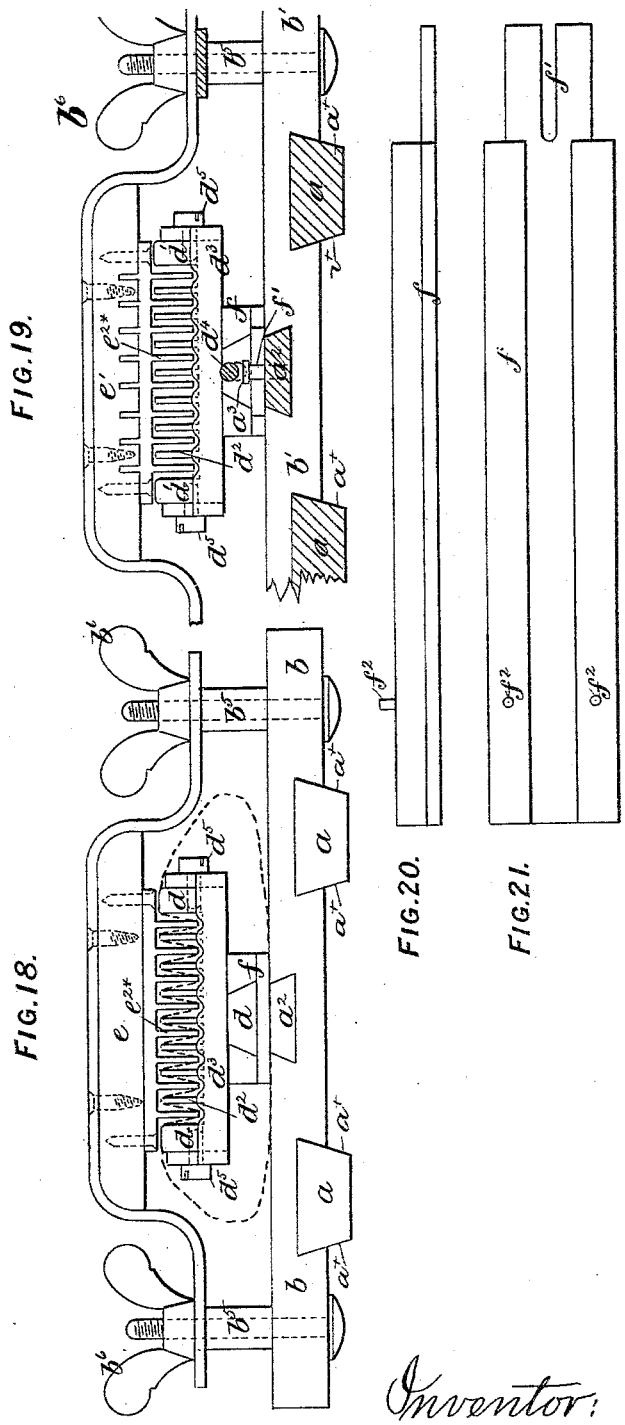

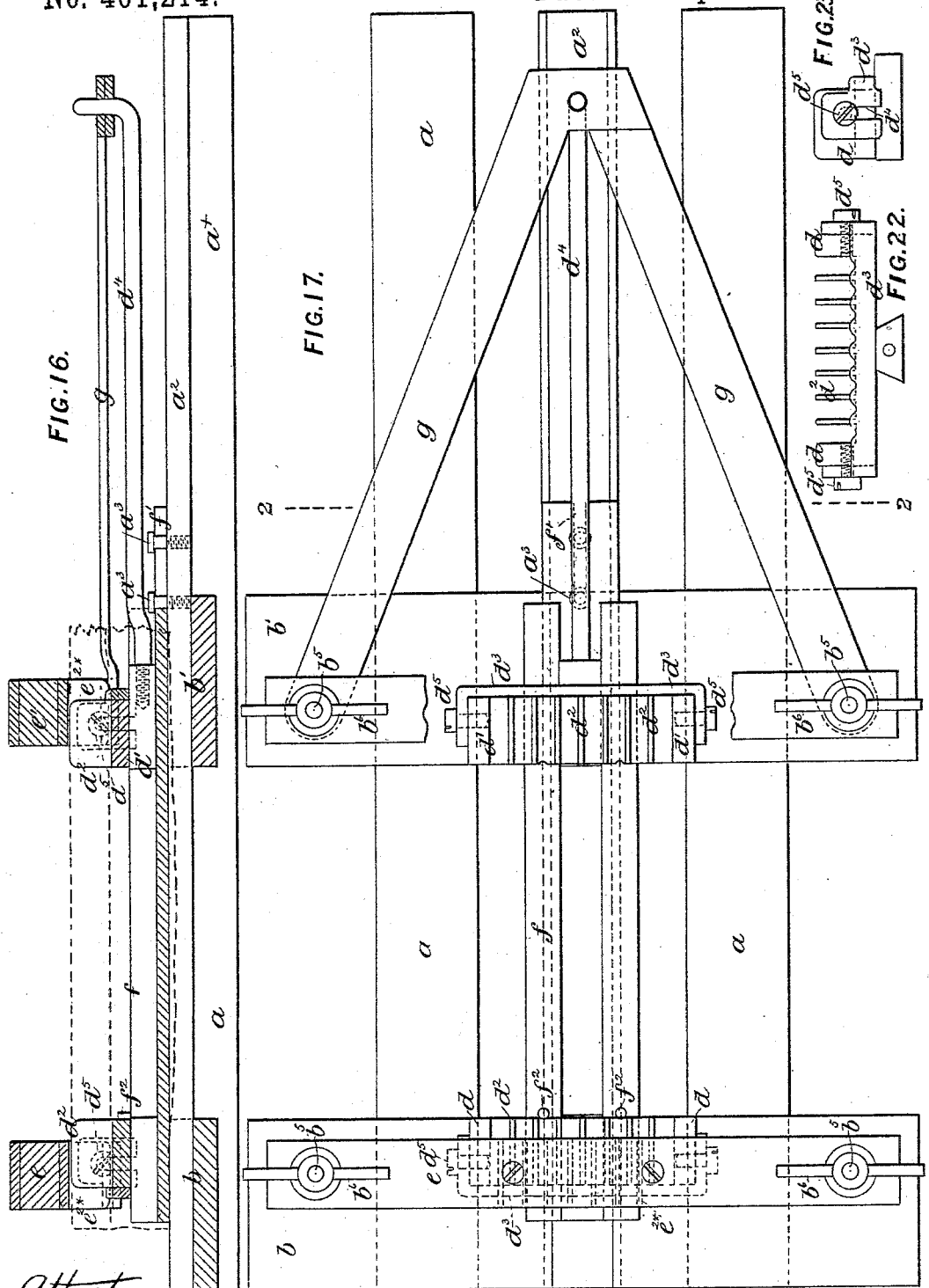

(No Model.) 7 Sheets—Sheet 6.
C. F. A. RÖELL.
PLAITING APPARATUS.

No. 401,214. Patented Apr. 9, 1889.

Attest:
Geo. T. Smallwood,
Walter Allen

Inventor
Cornelis-Frederik A. Röell
by Knight Bros.
Attys.

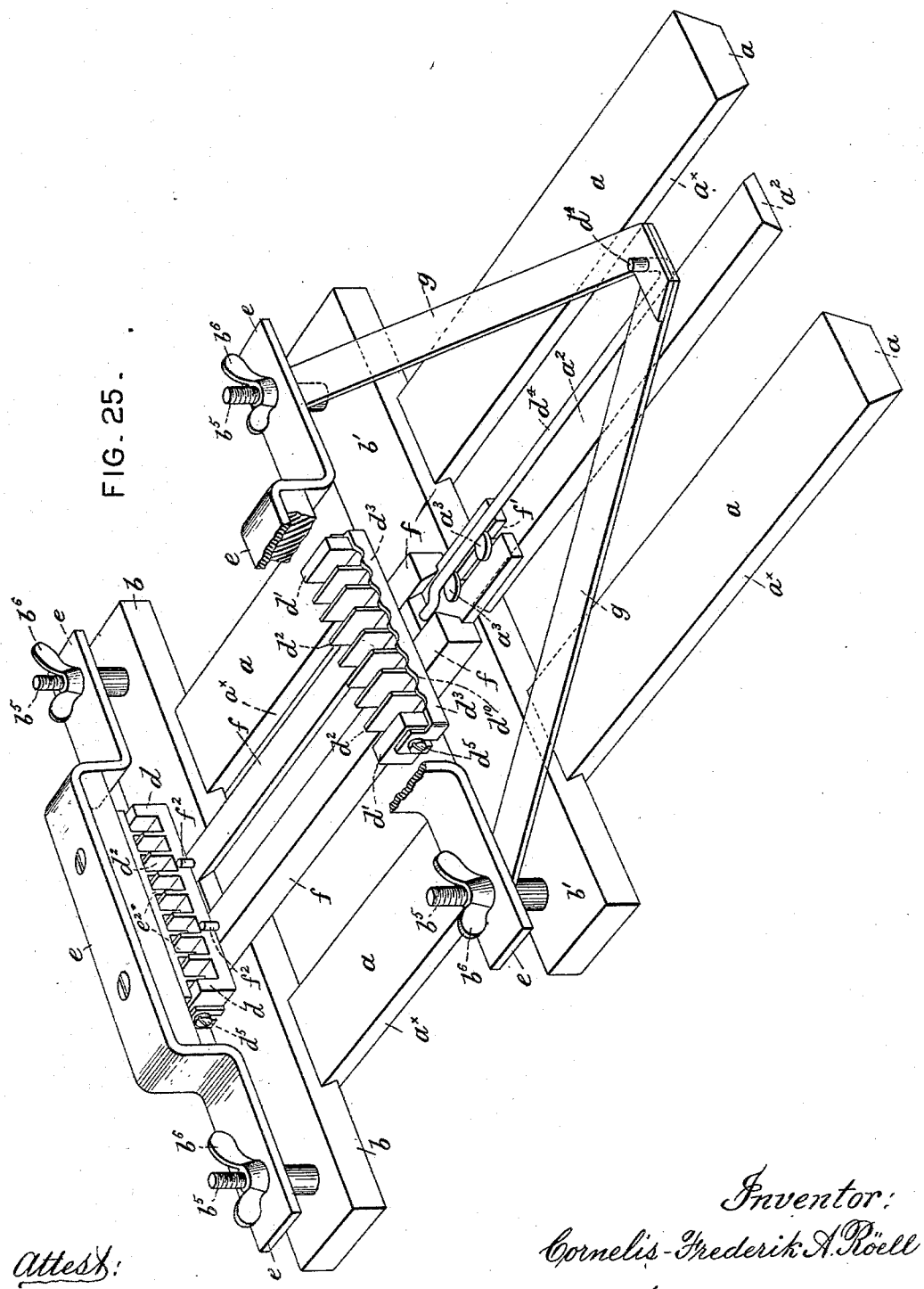

UNITED STATES PATENT OFFICE.

CORNELIS F. A. RÖELL, OF LONDON, ENGLAND.

PLAITING APPARATUS.

SPECIFICATION forming part of Letters Patent No. 401,214, dated April 9, 1889.

Application filed May 4, 1888. Serial No. 272,867. (No model.)

*To all whom it may concern:*

Be it known that I, CORNELIS FREDERIK ALEXANDER RÖELL, a subject of the King of Holland, residing at 59 Lincoln's Inn Fields, London, England, Jonkheer of the Kingdom of Holland, have invented certain new and useful Improvements in Means or Apparatus Employed in Plaiting or Smocking Various Fabrics; and I do hereby declare that the following is a full, clear, and exact description of the invention, which will enable others skilled in the art to which it appertains to make and use the same.

My invention has for its object improvements in those means or apparatus employed in plaiting or "smocking" which comprise guides or ways and cross-bars.

My improvement relates to a construction whereby I am enabled to plait or "smock" various fabrics either in the flat or when made into sleeves.

My improvements consist in the features of construction hereinafter described, and pointed out in the claims.

In order that my invention may be clearly understood and readily carried into effect, I will proceed, aided by the accompanying drawings, to describe the same.

The arrangement of apparatus represented at Figures 1 to 14, inclusive, and at Fig. 24 is applicable for plaiting or smocking fabric in the flat, and that represented at Figs. 15 to 23, inclusive, and at Fig. 25 is applicable to plaiting or smocking fabric when made up into sleeves or tubular articles.

Fig. 1 is a plan, Fig. 2 is a longitudinal section, and Fig. 3 is a side elevation, of my improved apparatus, showing the parts in position for commencing work. Fig. 4 is a plan of the apparatus, showing the parts in the position they would assume when having completed some work, as indicated in dotted lines in Fig. 2. Fig. 5 is a cross-section drawn on the line 1 1 of Fig. 4. Figs. 6 and 7 are respectively an inside face view and a cross-section of part of the fixed cross-bar. Figs. 8 and 9 are respectively an inside face view and a cross-section of part of the movable cross-bar. Figs. 10 and 11 are respectively an elevation and a cross-section of part of the fixed comb-bar. Figs. 12 and 13 are respectively an elevation and a cross-section of part of the movable comb-bar; and Fig. 14 is an elevation, drawn full size, of parts of the movable cross-bar and comb-bar with the loose wires in position. Figs. 15 and 16 are longitudinal sections with the parts drawn in two different positions, and Fig. 17 is a plan of a modification for plaiting or smocking sleeves or tubular articles, the parts being shown in the same position in Figs. 16 and 17. Fig. 18 is an end view. Fig. 19 is a cross-section drawn on the line 2 2 of Fig. 17. Figs. 20 and 21 are respectively a side elevation and a plan of guide for the movable bottom comb, and Figs. 22 and 23 are respectively an elevation and an end view of the bottom combs. Fig. 24 is a perspective view of the principal construction, and Fig. 25 is a perspective view of the modification of my apparatus.

In all the views of both principal construction and modification thereof like parts are indicated by similar letters of reference.

I will first describe the construction represented at Figs. 1 to 14, both inclusive, and at Fig. 24. I employ a base or frame consisting of or provided with parallel guides or ways $a\,a$, having undercut or beveled edges $a^\times$, to one end of which is fitted and fixed a cross-bar, $b$, while a similar cross-bar, $b'$, is fitted to and mounted on such guides $a\,a$, with capability of sliding thereon and of being temporarily fixed thereto in any desired position by means of pins or pegs $c$, which pass through holes in the cross-bar $b'$ and into corresponding holes, $a'$, formed in the guides $a\,a$. Other suitable means may, however, be employed for temporarily fixing the movable cross-bar $b'$ to the guides $a\,a$ in any required position. These cross-bars $b\,b'$ are each provided with a strip or cleat, $b^2$, extending longitudinally thereof and of a dovetail cross-section to receive a removable comb-bar, $d$ or $d'$, capable of being fixed thereon in the required position by means of screws or fastenings $b^\times$, passing through plates $b^3$ and $b^4\,b^4$, respectively, the plate $b^3$ occupying a central position on one comb-bar and the plates $b^4\,b^4$ occupying positions on each side of the center on the other comb-bar, so that the cross-bars $b\,b'$ may be enabled to be placed near together. Other means, however, of fixing the removable comb-bars $d\ d'$ may be employed. By these means comb-bars $d\ d'$ of different gages to suit different classes of work may be readily fitted to such cross-bars $b\ b'$ when required. These comb-bars $d\ d'$ are formed with longitudinal rabbets $d^x$ at opposite edges or corners, and transverse kerfs or saw-cuts $d^7$. The rabbets form seats for longitudinal strips $d^8$, secured by screws or fastenings $d^9$, and the kerfs or saw-cuts form seats for a series of parallel comb-plates, $d^2$, fixed crosswise of the bars, and they are formed with slots in their opposite edges to receive the longitudinal strips by which they are secured, and are also provided with an adjusting-plate, $d^3$, formed with notches or recesses $d^{10}$ in its upper edge and also with guide-slots $d^4\ d^4$, and mounted on screws $d^5\ d^5$, inserted in the comb-bar, which serve as both the guiding and fixing means, whereby the working depth of the combs $d^2$ may be regulated to the depth to which the plaiting or smocking is to be carried by simply raising or lowering the plate $d^3$, as may be required.

To each end of each cross-bar $b\ b'$ is also fixed a screwed upright, $b^5$, to receive an upper comb-bar, $e$ or $e'$, formed with comb-wires $e^2$ or plates $e^{2*}$, similar to the lower comb-bar plates. The wires $e^2$ are secured to the comb-bar $e$ by inserting them through horizontal holes, and the plates $e^{2*}$ are secured to the comb-bar $e'$ in kerfs or saw-cuts by a longitudinal strip, $e^*$, passed through slots in the plates and fastened by screws to the comb-bar. The wires or plates are capable of entering the spaces in the comb-bars $d\ d'$, and said upper comb-bars, $e\ e'$, are capable of being clamped down by fly-nuts $b^6$ on the screwed uprights. The bars $b$ and $b'$ are formed with channels or grooves $b^7$, to receive the lower edges of the adjusting-plates.

In the drawings I have shown the comb-bar $e$ to be fitted with comb-wires $e^2$ and the comb-bar $e'$ to be fitted with comb-plates $e^{2*}$; but they may both be fitted with either wires or plates.

In using the above-described apparatus I first place the fabric to be plaited or smocked in the comb-bars $d\ d'$, when the cross-bars $b\ b'$ are in close proximity to each other, as shown at Figs. 1, 2, and 3, the upper comb-bars, $e\ e'$, having been previously removed. In effecting this I employ a number of loose wires, $x$, or narrow flat plates or strips, which I place successively in the spaces of the comb-bars $d\ d'$, so as to carry the fabric down with them. Then when the desired width of plaiting or smocking has been thus far arranged I apply and fix to the cross-bars $b\ b'$ the upper comb-bars, $e\ e'$, the comb-plates of which I, by turning the fly-nuts $b^6$, cause to descend to the bottom of the working depth of the lower comb-plates of the lower comb-bars, $d\ d'$, the fabric being held between them. I then remove the loose wires $x$, or narrow flat plates or strips, from the comb-bars $d\ d'$, and I slide the movable cross-bar $b'$ with its coacting comb-bars $d'\ e'$ along the fabric, (one end of which is held securely by the comb-bars $d\ e$ on the fixed cross-bar $b$, assisted by a strip of rubber, $e^3$, acting against the comb-bar $e$,) so as to extend the plaiting or smocking to any desired length. The said movable cross-bar $b'$ is then fixed in position on the guides $a\ a$, when the plaiting or smocking may be completely stitched while on the apparatus, or it may be "run" together while on the apparatus and completed after removal therefrom.

I will now describe the modification represented at Figs. 15 to 23, both inclusive, and at Fig. 25. According to this modification I employ the guides $a\ a$, having undercut or under-beveled edges $a^*$, cross-bars $b\ b'$, and upper comb-bars, $e\ e'$, removably fixed by screwed uprights $b^5$ and fly-nuts $b^6$ to the cross-bars $b\ b'$ in a similar manner to that described with respect to the first-described construction, except that the comb-bars $e\ e'$ are shorter and of modified shape; but instead of fixing the comb-bars $d\ d'$ to the cross-bars $b\ b'$, I now support them in a guide-bar, $f$, removably fixed by a slot, $f'$, and studs $a^3$ at one end to a central guide-bar, $a^2$, and free at the other end, so as to permit of its being placed with the comb-bars $d\ d'$ within a sleeve or tubular article to be plaited or smocked. The guide-bar $f$ has two pins, $f^2$, fixed thereon, which act to prevent the comb-bar $d$ from moving in a longitudinal direction when the apparatus is in use, and in order that the comb-bar $d'$ may be moved to and fro with the cross-bar $b'$ and maintain its relation with the comb-bar $e'$, I connect the comb-bar $d'$ by a rod, $d^4$, to one end of links $g\ g$, the other ends of which are connected to the uprights $b^5$, carried by the movable cross-bar $b'$. The comb-bar $d'$ is capable of freely sliding along the guide-bar $f$, and both it and the comb-bar $d$ are capable of ready removal therefrom to permit of comb-bars of different gages being employed, as may be desired. In using this modification for plaiting or smocking fabric in the flat I proceed as described with respect to the first-described form; but when plaiting or smocking sleeves or tubular articles I first place the guide-bar $f$ and the comb-bars $d\ d'$, when the latter are in close proximity to each other, within the sleeve or tubular article. I then mount and fix such comb-guide bar $f$ in position on the frame and arrange the desired width of plaiting or smocking by means of wires $x$, as before described, after which I apply and fix to the cross-bars $b\ b'$ the upper comb-bars, $e\ e'$, and complete the plaiting or smocking, as before described.

Having thus described my invention, the following is what I claim as new therein and desire to secure by Letters Patent:

1. The combination, with suitable ways and cross-bars, of the lower comb-bars, each lower comb-bar having a series of comb-plates, and the upper comb-bars, each upper comb-bar having a series of comb-plates, substantially as described.

2. The combination, with suitable ways, of the cross-bars sliding thereon, the lower comb-bars secured to the cross-bars, the uprights secured to the ends of the cross-bars, the upper comb-bars through which the uprights project, and the fly-nuts by which the upper comb-bars are secured, substantially as described.

3. The combination, with suitable ways and cross-bars, of the lower comb-bars, each lower comb-bar having a series of comb-plates, the adjustable plates for regulating the depth of work between the comb-plates, and the upper comb-bars, each upper comb-bar having a series of comb-plates, substantially as described.

4. The combination, with suitable ways and cross-bars, of the lower comb-bars, each lower comb-bar having a series of comb-plates, the guide-bars, the upper comb-bars, each upper comb-bar having comb-plates, the links connected to the traversing cross-bar, and the rod connected to the lower traversing comb-bar and to the links, substantially as described.

C. F. A. RÖELL.

Witnesses:
   B. J. B. MILLS,
   C. M. WHITE,
*Both of 23 Southampton Buildings, London, England.*